(12) United States Patent
Yoshikawa

(10) Patent No.: US 6,768,598 B2
(45) Date of Patent: Jul. 27, 2004

(54) IMAGE PICKUP SYSTEM

(75) Inventor: Koichi Yoshikawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/405,168

(22) Filed: Apr. 1, 2003

(65) Prior Publication Data

US 2003/0214575 A1 Nov. 20, 2003

(30) Foreign Application Priority Data

Apr. 2, 2002 (JP) .......................... 2002-100224

(51) Int. Cl.$^7$ .......................... G02B 13/06; G02B 23/08
(52) U.S. Cl. .......................... 359/725; 359/403
(58) Field of Search .......................... 359/725, 403; 348/159, 47

(56) References Cited

U.S. PATENT DOCUMENTS

| | | | | |
|---|---|---|---|---|
| 6,115,176 A | * | 9/2000 | Nalwa | 359/403 |
| 6,195,204 B1 | * | 2/2001 | Nalwa | 359/403 |
| 2003/0090788 A1 | * | 5/2003 | Yoshikawa | 359/363 |

* cited by examiner

*Primary Examiner*—David N. Spector
(74) *Attorney, Agent, or Firm*—Bell, Boyd & Lloyd LLC

(57) ABSTRACT

The image pickup device includes a plurality of plane mirrors arranged in the form of a polygonal pyramid, and a plurality of cameras disposed opposite the plane mirrors, respectively. The angle of incidence of a ray passing along the optical axis of a lens of the camera on the plane mirror is set to be less than 45 degrees.

4 Claims, 9 Drawing Sheets

IMAGE PICKUP SYSTEM

BACKGROUND OF THE INVENTION

The present invention relates to an image pickup system capable of picking up a wide range such as an omnidirectional or full-circumferential image.

As is generally known, a variety of cameras for simultaneously shooting omnidirectional or full-circumferential images, which comprise a multiplicity of video cameras contained in a casing, have been developed.

As one of the methods for the simultaneous image pickup, for example, a method has been proposed in which the parallax which may be generated among a plurality of cameras is dissolved by ensuring that image pickup view points virtually coincide with each other by use of mirrors arranged in the form of a polygonal pyramid (see U.S. Pat. No. 6,115,176).

A general constitution of one example of the above-mentioned image pickup system using the mirrors arranged in the form of a polygonal pyramid is shown in FIG. 6. The image pickup system comprises eight plane mirrors 44 arranged in a polygonal pyramid, in this case, an octagonal pyramid, and cameras 41 arranged opposite the plane mirrors 44 in one-to-one correspondence respectively. In FIG. 6, two plane mirrors 44 and two cameras 41 disposed on a vertical plane containing the centerline of the image pickup system are shown. Each camera 41 comprises a lens 42 and an image pickup device 43, and the camera 41 is assembled by attaching the lens 42 to a camera main body (not shown) in which the image pickup device 43 and other component parts are contained.

In the image pickup system, angle-of-view end rays 46A passing through the uppermost portion of the angle of view, angle-of-view end rays 46B passing through the lowermost portion of the angle of view, and a ray passing along the optical axis 47 of the lens 42 and reflected by the mirror 44, are incident on the lens 42, and are focused to form an image on the image pickup device 43.

In the plurality of cameras 41, the virtual view centers 45 generated by the plane mirrors 44 are caused to substantially coincide with each other, whereby parallax can be restrained. As a result, by splicing the images picked up by the plurality of cameras 41, wide-range images such as an omnidirectional or full-circumferential image can be obtained.

In the case of FIG. 6, the angle of incidence of the ray passing along the lens optical axis 47 on the plane mirror 44 is 45 degrees. Therefore, the ray passing along the lens optical axis 47 is horizontally incident on the plane mirror 44, is reflected by the plane mirror 44, and is vertically incident on the lens 42.

In the image pickup system shown in FIG. 6, the distance between the angle-of-view end rays 46A passing through the lowermost portion of the angle of view and a tip corner of the lens 42 is CL. So that the tip of the lens 42 is not mirrored, i.e., to pick up an image free of "eclipse" (shading), it is necessary that CL>0.

As shown in FIG. 6, the factors dominantly determining the size of the image pickup system are the height HL from the upper end of the mirror 44 to the lower end of the camera 41 (in FIG. 6, to the image pickup device 43), and the extent LL between the upper end portion of the octagonal pyramid form mirrors 44. Then, in order to reduce the image pickup system in size, it is required to reduce the height HL and the extent LL.

In order to reduce the height HL and the extent LL, it suffices to set the cameras 41 (the lenses 42 and the image pickup devices 43) closer to the plane mirrors, as shown in FIG. 7. As a result, the plane mirrors 44S can be made to be smaller than the plane mirrors 44 in FIG. 6, and the height HS from the upper end of the mirror 44S to the lower end of the camera 41 and the extent LS of the upper end portion of the octagonal pyramid form mirror 44S satisfy HS<HL and LS<LL.

In the case of FIG. 7, however, the distance between the angle-of-view end rays passing through the lowermost portion of the angle of view and the tip corner of the lens 42 is "negative", and "eclipse" (shading) occurs, which is inconvenient for image pickup. Therefore, it is necessary that the distance C (best shown in FIG. 8) between the angle-of-view end rays passing through the lowermost portion of the angle of view and the tip corner of the lens 42 be positive and as small as possible. In this instance, the diameter D of the tip end of the lens 42 of the camera 41 constitutes a restriction on the reduction of the size of the image pickup system.

From the foregoing, the camera 41 cannot be set closer to the plane mirror than the position where the distance C=0. Besides, in the case where the size (particularly the width) of the camera main body 41A in which the image pickup device 43 and the like are contained is much larger as compared with the lens 42, as indicated by broken line in FIG. 6, the camera main bodies 41A of the plurality of cameras 41 will interfere with each other as the cameras 41 are brought closer to the plane mirrors. For example, where each camera is composed by use of three CCD image pickup devices, the camera main body is considerably large.

Due to these restrictions, it has been difficult to achieve a further reduction in the size of the image pickup system. In addition, in the constitution of the image pickup system shown in FIG. 6, the plane mirror 44 and the optical axis 47 of the lens 42 of the camera 41 are in the positional relationship of the incidence angle of 45 degrees, and this positional relationship determines the size of the plane mirrors 44; as a result, the size of the polygonal pyramid form mirror and the overall size of the image pickup system become large.

Particularly, the factors dominantly determining the size of the image pickup device are the height HL from the upper end of the plane mirror 44 to the lower end of the camera 41 and the extent LL of the upper end portion of the pyramid form mirror 44. Furthermore, the values of the height HL and the extent LL are influenced also by the distance C (CL in FIG. 6) between the angle-of-view end rays passing through the lowermost portion of the angle of view and the tip corner of the lens 42, and, therefore, it is necessary to appropriately set the distance C.

However, the virtual view centers 45 of the plurality of cameras 41 can be caused to substantially coincide with each other, independently from the value of the distance C, so that the distance C can take an arbitrary value. Hitherto, the distance C has not been set to an appropriate value, and, accordingly, the image pickup device has been large in overall size.

SUMMARY OF THE INVENTION

In order to solve the above-mentioned problems, it is an object of the present invention to provide an image pickup system having a smaller size, by reducing the sizes of the mirrors and the image pickup device as a whole.

In accordance with one aspect of the present invention, there is provided an image pickup system comprising a plurality of plane mirrors arranged in the form of a polygonal pyramid, and a plurality of cameras disposed opposite the mirrors respectively, wherein the angle of incidence of the ray passing along the optical axis of a lens of each camera on the plane mirror is less than 45 degrees.

According to the above constitution of the image pickup system according to the present invention, since the angle of incidence of the ray passing along the optical axis of the lens of the camera on the plane mirror is less than 45 degrees, the height from the upper end of the plane mirror to the lower end of the camera can be reduced, and the area of the base surface of the polygonal pyramid constituted of the plane mirrors can be reduced. As a result, it is possible to reduce the overall size of the image pickup system.

In accordance with another aspect of the present invention, there is provided an image pickup system comprising a plurality of plane mirrors arranged in the form of a polygonal pyramid and a plurality of cameras disposed opposite the plane mirrors respectively, wherein the relationships of D/A<4 and f/D>0.15 are fulfilled, where D is the diameter of the tip portion of a lens of the camera, f is the focal length of the lens, and A is the diagonal length of an image pickup device of the camera.

According to the above constitution of the image pickup system according to the present invention, since the relationships of D/A<4 and f/D>5 are fulfilled, where D is the diameter of the tip portion of the lens of the camera, f is the focal length of the lens, and A is the diagonal length of the image pickup device of the camera, it is possible to reduce the diameter D of the tip portion of the lens under the condition where the diagonal length A of the image pickup device and the focal length f of the lens are fixed, and thereby reducing the size of the image pickup system.

In accordance with a further aspect of the present invention, there is provided an image pickup system comprising a plurality of plane mirrors arranged in the form of a polygonal pyramid, and a plurality of cameras disposed opposite the plane mirrors respectively, wherein the relationship of 0<C<2A is fulfilled, where C is the distance from a tip corner of a lens of the mirror to an image pickup angle-of-view end ray nearest thereto, and A is the diagonal length of an image pickup device of the camera.

According to the above constitution of the image pickup system according to the present invention, since the relationship of 0<C<2A is fulfilled, where C is the distance from the tip corner of the lens of the camera to the image pickup angle-of-view end ray nearest thereto, and A is the diagonal length of the image pickup device of the camera, it is possible to reduce the distance C from the tip corner of the lens of the camera to the image pickup angle-of-view end ray nearest thereto under the condition where the diagonal length A of the image pickup device is fixed, and thereby reducing the size of the image pickup system.

Additional features and advantages of the present invention are described in, and will be apparent from, the following Detailed Description of the Invention and the figures.

DETAILED DESCRIPTION OF THE INVENTION

In accordance with the present invention, there is provided an image pickup system comprising a plurality of plane mirrors arranged in the form of a polygonal pyramid, and a plurality of cameras disposed opposite the plane mirrors respectively, wherein the angle of incidence of a ray passing along the optical axis of a lens of the camera on the plane mirror is less than 45 degrees.

In addition, according to the present invention, in the above image pickup system, the plane mirror is disposed as an intermediate position among a lens group consisting of a plurality of lenses.

In accordance with the present invention, there is provided an image pickup system comprising a plurality of plane mirrors arranged in the form of a polygonal pyramid, and a plurality of cameras disposed opposite the plane mirrors respectively, wherein the relationships of D/A<4 and f/D>0.15 are fulfilled, where D is the diameter of a tip portion of a lens of the camera, f is the focal length of the lens, and A is the diagonal length of an image pickup device of the camera.

In accordance with the present invention, there is provided an image pickup system comprising a plurality of plane mirrors arranged in the form of a polygonal pyramid, and a plurality of cameras disposed opposite the plane mirrors respectively, wherein the relationship of 0<C<2A is fulfilled, where C is the distance from a tip corner of a lens of the camera to an image pickup angle-of-view end ray nearest thereto, and A is the diagonal length of an image pickup device of the camera.

Figure 1:
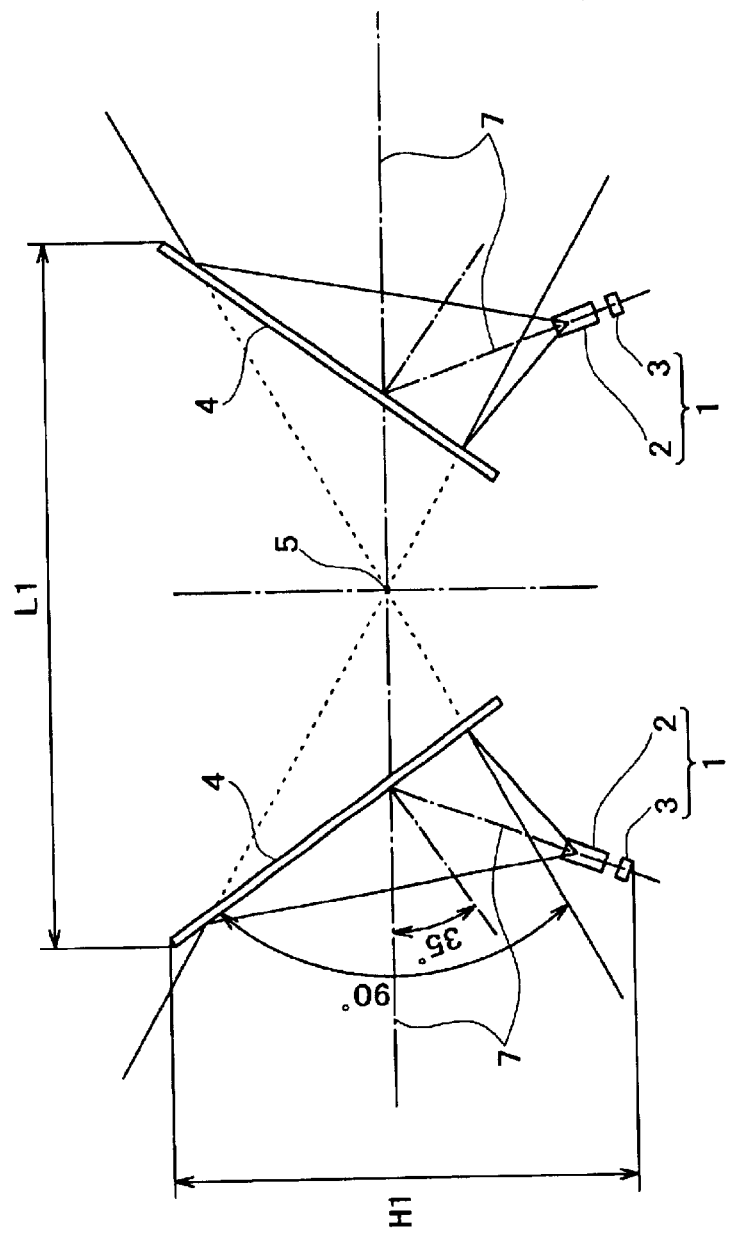
FIG. 1 is a general constitutional diagram of one embodiment of the image pickup system according to the present invention.

FIG. 1 is a general constitutional diagram of the image pickup system as one embodiment of the present invention. FIG. 1 is a sectional view on a vertical plane containing the centerline of the image pickup system.

The image pickup system comprises eight plane mirrors 4 arranged in the form of a polygonal pyramid, in this case, an octagonal pyramid, and cameras 1 disposed respectively opposite the plane mirrors 4 in a one-to-one correspondence. In FIG. 1, two plane mirrors 4 and two cameras 1 disposed on the vertical plane containing the centerline of the image pickup system are shown.

Each camera 1 comprises a lens 2 and an image pickup device 3, and is assembled by attaching the lens 2 to a camera main body (not shown) in which the image pickup device 3 and the like are contained. The incident rays are reflected by the mirrors 4, incident on the lenses 2, and focused to form images on the image pickup devices 3.

In the plurality of cameras 1, the virtual view centers 5 generated by the plane mirrors 4 are set to substantially coincide with each other, whereby parallax can be restrained. As a result, by splicing the images picked up by the plurality of cameras 1, it is possible to obtain wide-range images such as an omnidirectional or full-circumferential image.

In the image pickup system according to this embodiment of the present invention, particularly, the angle of incidence of the ray passing along the optical axis 7 of the lens 2 on the plane mirror 4 is 35 degrees. The ray passing along the lens optical axis 7 is horizontally incident on the plane mirror 4, is reflected by the plane mirror 4, and is incident on the lens 2 in an oblique direction against the vertical direction.

In this constitution, the overall height of the image pickup system is the height H1 from the upper end of the plane mirror 4 to the lower end of the camera 1 (in FIG. 1, to the image pickup device 3). The height H1 and the extent L1 of the top surface of the mirrors 4 forming the polygonal pyramid are dominant dimensions of the image pickup system as a whole.

Figure 2:
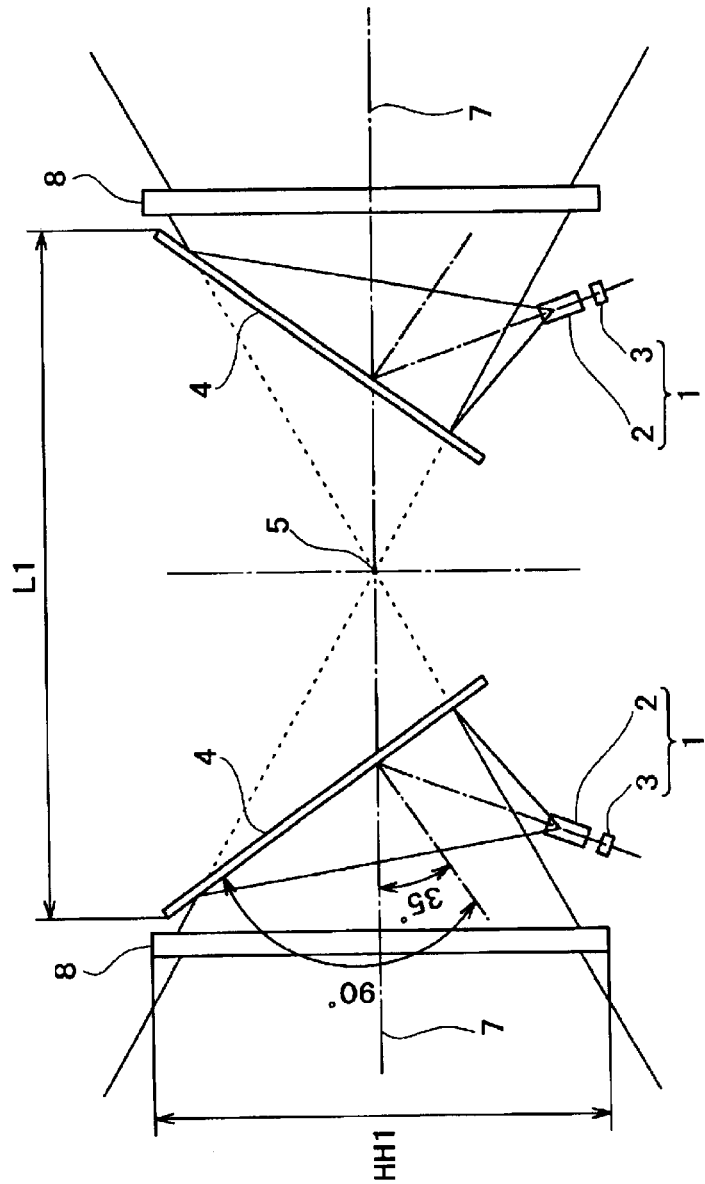
FIG. 2 is a general constitutional diagram of another embodiment of the image pickup system according to the present invention.

Furthermore, as another embodiment of the image pickup system according to the present invention, a general constitutional diagram of an image pickup system constituted by modifying the image pickup system shown in FIG. 1 is shown in FIG. 2.

In the present embodiment, a lens front group 8 is disposed on the front stage of the plane mirrors 4, and the plane mirrors 4 are disposed at intermediate positions between the lens front group 8 and lenses (lens rear group) 2 attached to camera main bodies. Namely, each plane mirror 4 is disposed at an intermediate position among a lens group consisting of a plurality of lenses.

In the image pickup system according to this embodiment of the present invention, also, the angle of incidence of the ray passing along the lens optical axis 7 on the plane mirror 4 is 35 degrees.

In this constitution, the overall height of the image pickup system is the height HH1 of the lens front group 8. The height HH1 and the extent L1 of the top surface of the mirrors 4 forming the polygonal pyramid are dominant dimensions of the image pickup system as a whole. The other constitutions are the same as those of the image pickup system according to the preceding embodiment shown in FIG. 1, so that they are denoted by the same symbols as used above, and explanation thereof is omitted.

Figure 6:
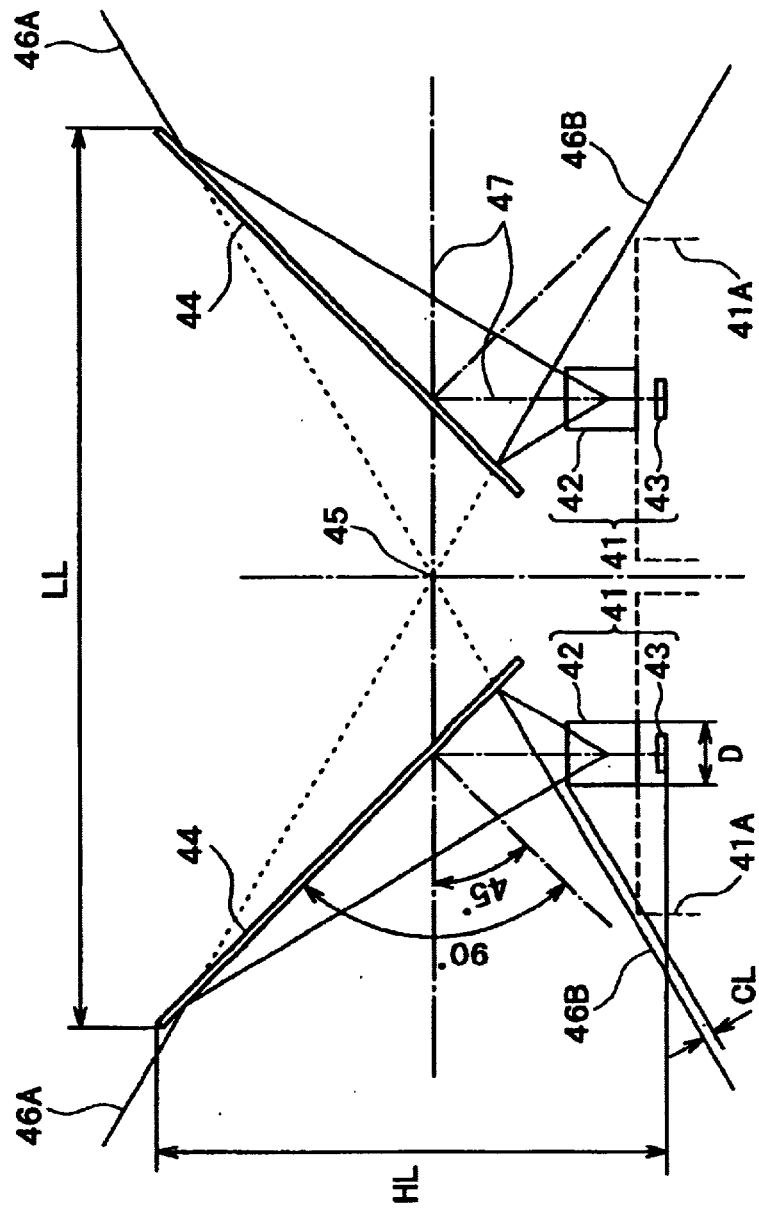
FIG. 6 is a general constitutional diagram of one example of an image pickup system using mirrors arranged in the form of a polygonal pyramid.
Figure 7:
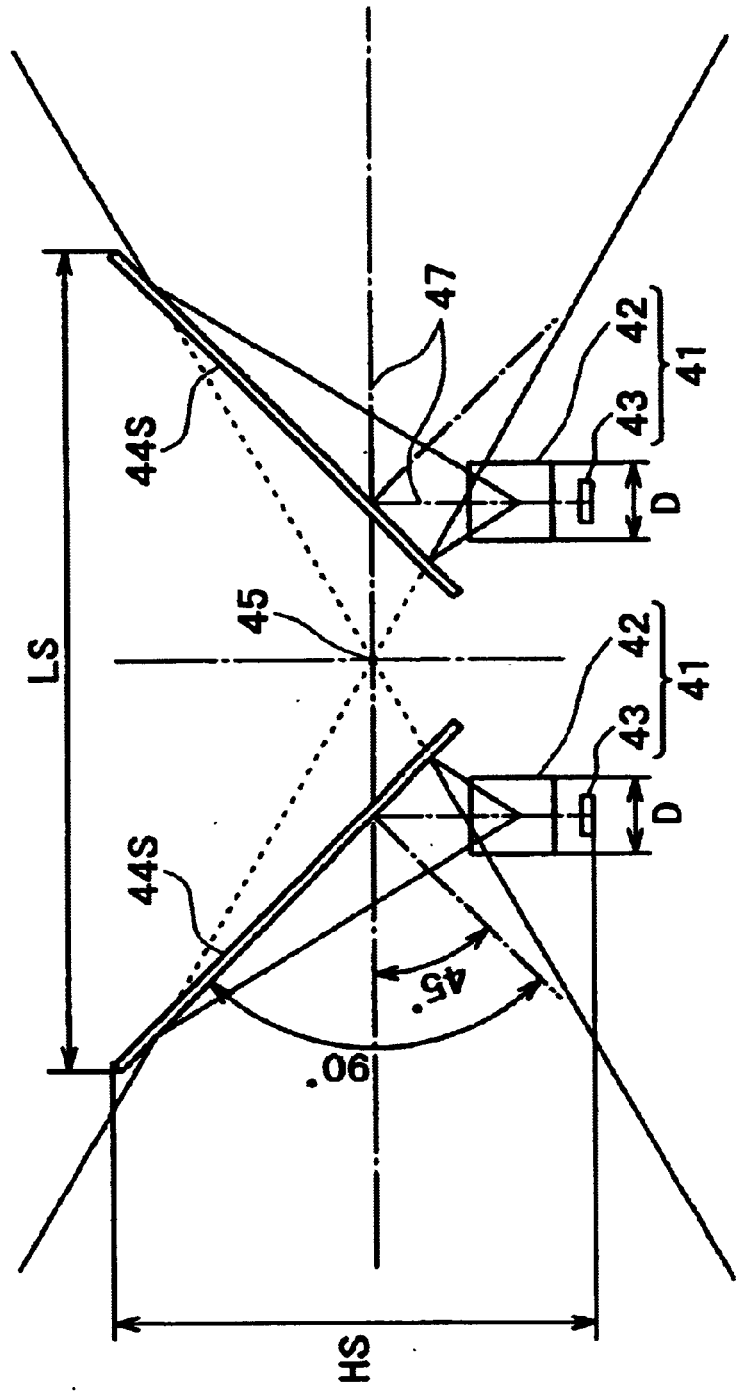
FIG. 7 is a diagram illustrating the constitution in which cameras are set closer to plane mirrors, as compared with the case of the image pickup system shown in FIG. 6.
Figure 8:
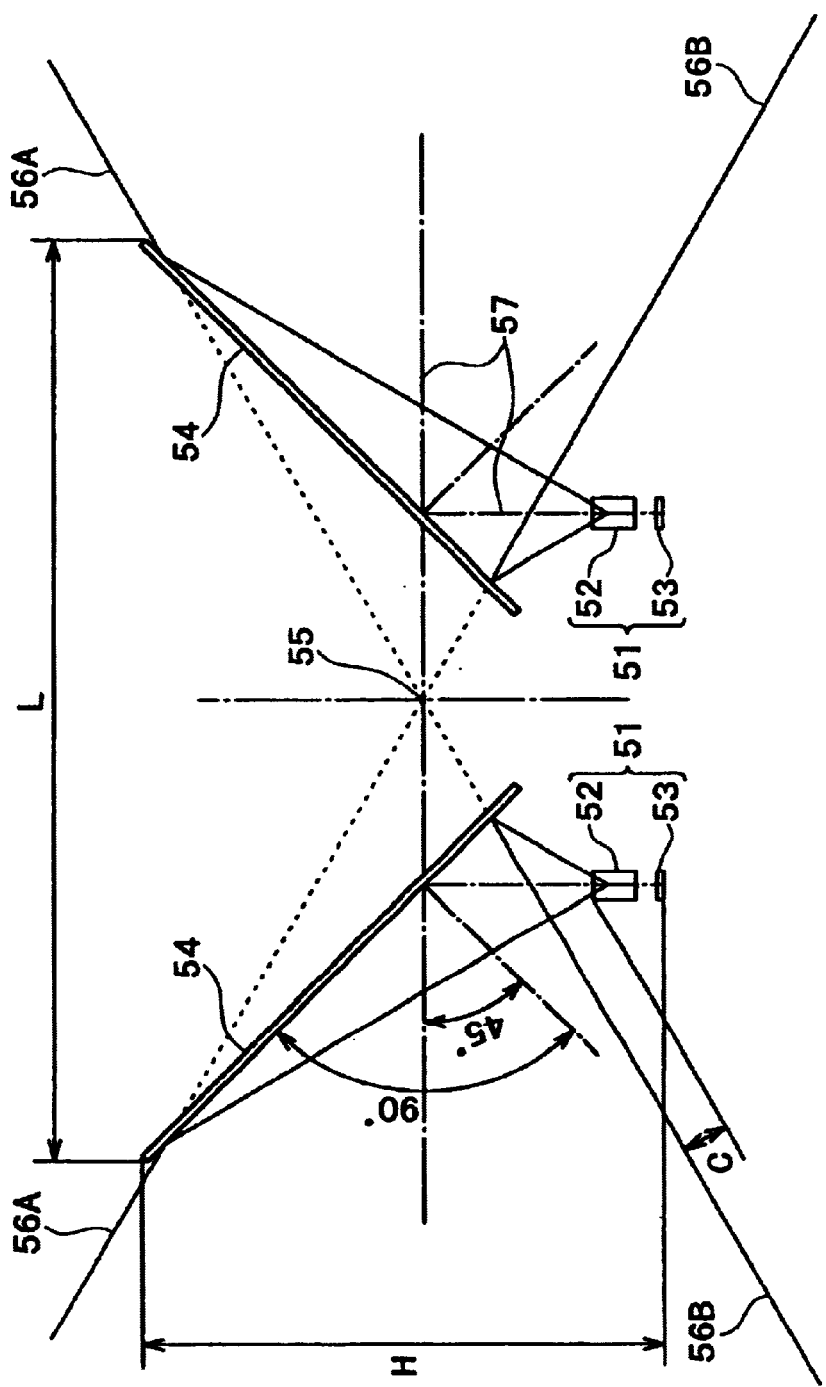
FIG. 8 is a general constitutional diagram of one example of an image pickup system using mirrors arranged in the form of a polygonal pyramid.
Figure 9:
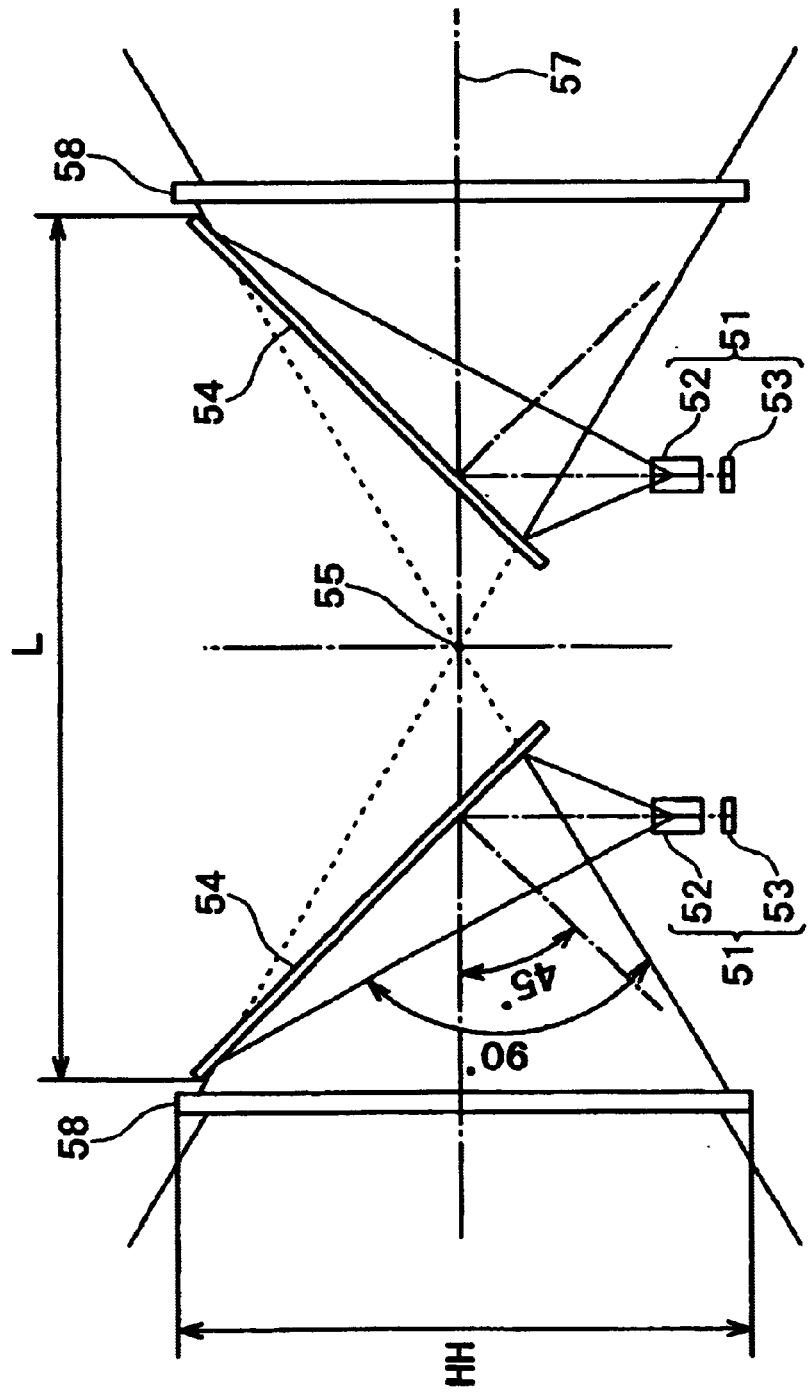
FIG. 9 is a general constitutional diagram of an image pickup system constituted by adding a lens front group to the image pickup system shown in FIG. 8.

Here, for comparison, image pickup systems in which the angle of incidence of the ray passing along the optical axis of the lens of the camera on the plane mirror at 45 degrees, in the same manner as in the constitutions shown in FIGS. 6 and 7, are shown in FIGS. 8 and 9.

The image pickup system shown in FIG. 1 and the image pickup system shown in FIG. 8 comprise the cameras 1, 51 constituted by use of the same lens as the lenses 2, 52, and equal to each other in the size of the camera 1, 51, the distance from the lens 2, 52 to the plane mirror 4, 54, and the angle of view for image pickup. The image pickup system shown in FIG. 9 is constituted by adding a lens front group 58, which is the same as the lens front group 8 in FIG. 2, to the image pickup system shown in FIG. 8.

When the image pickup systems shown in FIGS. 1 and 2 and the image pickup systems shown in FIGS. 8 and 9 are compared with each other as to the overall height of the image pickup system (the height H1, H from the upper end of the plane mirror 4, 54 to the lower end of the camera 1, 51, and the height of the lens front group HH1, HH) and also the extension L1, L of the top surface of the polygonal pyramid form mirror, those respective relations are H1<H, HH1<HH, and L1<L; namely, it is seen that the image pickup systems of FIGS. 1 and 2 are clearly smaller.

In other words, it is seen that in the image pickup systems shown in FIGS. 1 and 2, the angle of incidence of the ray passing along the optical axis 7 of the lens 2 on the plane mirror 4 is set at 35 degrees, which is smaller than the angle of incidence of 45 degrees in FIGS. 8 and 9, whereby it is possible to reduce the size of the image pickup system without setting the lens 2 closer to the plane mirror 4.

In addition, this setting is particularly effective where the camera main body is large, since the image pickup system can be reduced in size while preventing the camera main bodies from interfering with each other, even where the camera main bodies are large, as has been described above.

According to the constitution of the image pickup system according to each of the above embodiments, the angle of incidence of the ray passing along the optical axis 7 of the lens 2 on the plane mirror 4 is set at 35 degrees, whereby the overall height of the image pickup system can be reduced, and the area of the base surface of the polygonal pyramid constituted of the plane mirrors can be reduced, so that the image pickup system can be reduced in size.

Therefore both the degree of freedom in installation and the portability of the image pickup system can be enhanced. In addition, since optical component parts such as mirrors and the like and mechanism component parts for supporting the optical component parts can be reduced in size, it is possible to reduce the manufacturing cost and parallax through enhancement of component part accuracy.

Incidentally, while the angle of incidence of the ray passing along the optical axis 7 of the lens 2 on the plane mirror 4 is set at 35 degrees in the image pickup systems shown in FIGS. 1 and 2, the effect of reducing the size of the image pickup system can be obtained in the same manner when the angle of incidence is set to be less than 45 degrees.

Figure 3:
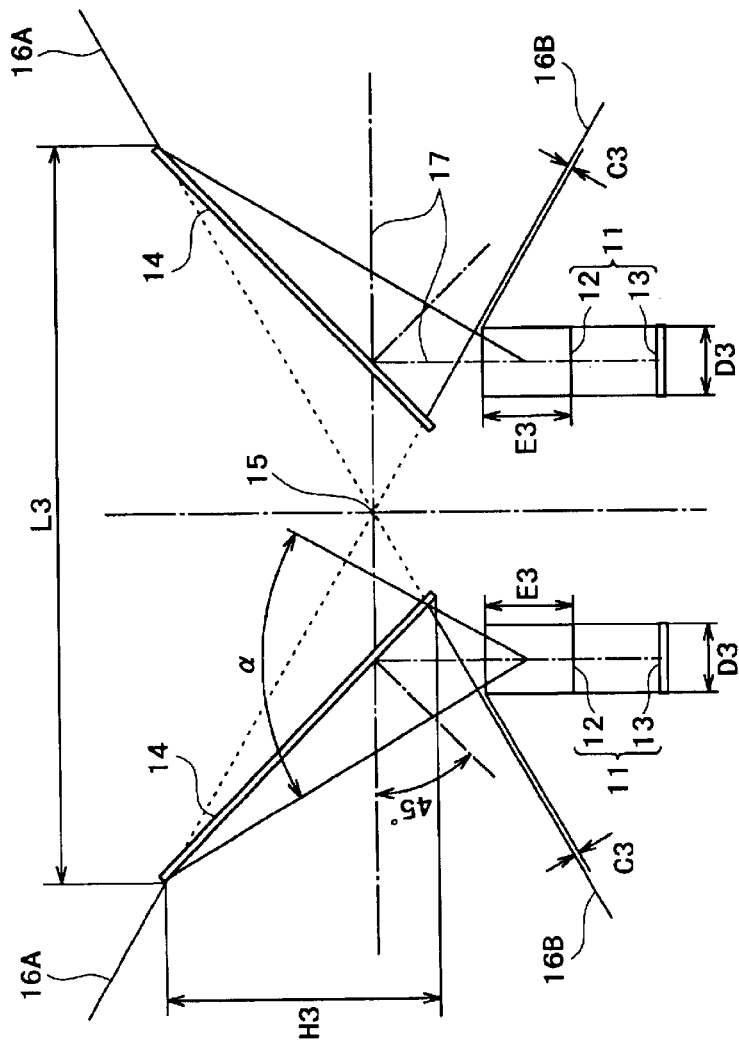
FIG. 3 is a general constitutional diagram of a further embodiment of the image pickup system according to the present invention.

Next, a general constitutional diagram of a further embodiment of the image pickup system according to the present invention is shown in FIG. 3. The image pickup system comprises eight plane mirrors 14 arranged in the form of a polygonal pyramid, in this case, an octagonal pyramid, and cameras 11 arranged respectively opposite the plane mirrors 14 in a one-to-one fashion. In FIG. 3, two plane mirrors 14 and two cameras 11 disposed on a vertical plane containing the center line of the image pickup system are shown.

Each camera 11 comprises a lens 12 and an image pickup device 13, and is assembled by attaching the lens 12 to a camera main body (not shown) in which the image pickup device and the like are contained. The incident rays are reflected by the mirrors 14, incident on the lenses 12, and focused to form images on the image pickup devices 13. In addition, the angle of incidence of the ray passing along the lens optical axis 17 on the plane mirror 14 is 45 degrees.

In the plurality of cameras 11, the virtual view centers 15 by the plane mirrors 14 are set to substantially coincide with each other, whereby parallax can be restrained. As a result, by splicing the images picked up by the plurality of cameras 11, wide-range images such as an omnidirectional or full-circumferential image can be obtained.

In the present embodiment, particularly as the lens 12 of the camera 11, a small lens of which the diameter D3 of a tip portion is adopted. With the small lens 12 thus constituted by adopting a lens of which the diameter D3 of a tip portion, the restriction for avoiding the generation of "eclipse" (shading) at the tip corner of the lens 12 when the lens 12 is set closer to the plane mirror 14 in the same manner as shown in FIG. 7 above ((the distance from the angle-of-view end ray 16B passing through the lowermost portion of the angle of view to the tip corner of the lens 12)>0) can be moderated, and a further reduction in the size of the image pickup system can be contrived.

Furthermore, in the present embodiment, the lens 12 of the camera 11 is so constituted as to satisfy the following conditional expressions:

$$D/A < 4 \quad (1)$$

$$f/D > 0.15 \quad (2)$$

where D is the diameter of the tip portion of the lens of the camera, A is the diagonal length of the image pickup device of the camera, and f is the focal length of the lens.

The conditional expressions (1) and (2) mean that when the expressions (1) and (2) are satisfied, where the angle of view is not less than a certain value, the diameter D of the tip portion of the lens, for fixed sizes of the lens and the image pickup device, is reduced and, as a result, the image pickup system can be reduced in size.

Here, the grounds for the conditional expressions (1) and (2) will be described. When it is assumed that a CCD solid state image pickup device or a CMOS type solid state image pickup device is used for the cameras, the value of the diagonal length A of the image pickup device is generally about 1 to 12 mm.

In addition, when the angle of view in the vertical direction is presumed to be 2×β, under the condition for avoiding the mirroring of the lens itself, $$\beta \leq 45 \text{ degrees} \quad (11)$$

and $$2f \times \tan\beta = A \quad (12).$$

Therefore, from the expressions (11) and (12), $$f \geq A/2 \quad (13).$$

Next, several cases will be separately taken into consideration, paying attention to the value of the diagonal length A of the image pickup device.

(i) Where A=1 mm, $f \geq 0.5$ from Expression (13).
When f=0.5 is put into the conditional expressions, $$D < 4 \times A = 4 \text{ and}$$

$$D < f/0.15 \qquad D < 3.3$$

therefore, D<3.3 mm.
When f=100 is put into the conditional expressions, $$D < 4 \times A = 4 \text{ and}$$

$$D < f/0.15 \qquad D < 667$$

therefore, D<4 mm.
(ii) Where A=3 mm, $f \geq 1.5$ from Expression (13).

When f=1.5 is put into the conditional expressions, $$D < 4 \times A = 12 \text{ and}$$

$$D < f/0.15 \qquad D < 10$$

therefore, D<10 mm.
When f=100 is put into the conditional expressions, $$D < 4 \times A = 12 \text{ and}$$

$$D < f/0.15 \qquad D < 667$$

therefore, D<12 mm.
(iii) Where A=6 mm, $f \geq 3$ from Expression (13).
When f=3 is put into the conditional expressions, $$D < 4 \times A = 24 \text{ and}$$

$$D < f/0.15 \qquad D < 20$$

therefore, D<20 mm.
When f=100 is put into the conditional expressions, $$D < 4 \times A = 24 \text{ and}$$

$$D < f/0.15 \qquad D < 667$$

therefore, D<24 mm.
(iv) Where A=12 mm, $f \geq 6$ from Expression (13),
When f=6 is put into the conditional expressions, $$D < 4 \times A = 48$$

and $$D < f/0.15 < 40$$

therefore, D<40 mm.
When f=100 is put into the conditional expressions, $$D < 4 \times A = 48 \text{ and}$$

$$D < f/0.15 \qquad D < 667$$

therefore, D<48 mm.

On the other hand, in the case of an optical system for video camera, it is necessary to arrange a low-pass filter, an infrared cut filter or a color separation prism for separating the three RGB colors or the like on the rear side of the lens, so that a larger back focus is required as compared to a film lens. Due to this, there rises the need for enlarging the diameter D of the tip portion of the image pickup lens. Under these conditions, the value of the diameter D of the tip portion of the image pickup lens in (i) to (iv) is a sufficiently small value, and is a feasible value. Contributions of this will be described.

Here, it is presumed, for example, that the distance C3 between the angle-of-view end ray 16B passing through the lowermost portion of the angle of view to the tip corner of the lens 12 is 0.85 mm, the diameter D3 of the tip portion of the lens 12 is 15 mm, the length E3 of the lens 12 is 18 mm, the angle of view α of the lens 12 corresponding to the longer side of the rectangle of the image pickup device 13 is 60 degrees, the diagonal length A3 of the image pickup device 13 is 6 mm, and the focal length f3 of the lens 12 is 4.5 mm.

When these values are put into Expressions (1) and (2), $$D/A = D3/A3 = 15/6 = 2.5 < 4$$

$$f/D = f3/D3 = 4.5/15 = 0.3 > 0.15$$

so that the conditional expressions are satisfied.

In addition, in the case of the above size constitution, the height H3 from the upper end of the plane mirror 14 to the lower end and the extent L3 of the top surface of the pyramid formed mirror, which dominantly determine the size of the image pickup system, are H3=59 mm and L3=155 mm respectively. The height from the upper end of the plane mirror 14 to the lower end of the lens 12, inclusive of the mirror 14 and the lens 12, is 90 mm. The size of the image pickup system as a whole further includes the size of the camera 11.

According to the above embodiment, the diameter D3 of the tip portion of the lens 12 of the camera 11, the focal length 13 of the lens 12, and the diagonal length A3 of the image pickup device 13 satisfy the relationships of D3/A3<4 and f3/D3>0.15, whereby it is possible to further reduce the diameter D3 of the tip portion of the lens 12 under the condition where the diagonal length A3 of the image pickup device 13 and the focal length f3 of the lens 12 are fixed, i.e., where the same camera 11 is used, so that it is possible to reduce the image pickup system in size.

Since the size of the image pickup system can be reduced, the degree of freedom in installation and the portability of the image pickup system can be enhanced. Besides, since optical component parts such as mirrors and the like and mechanism component parts for supporting the optical component parts can be reduced in size, it is possible to reduce the manufacturing cost and parallax through enhancement of component part accuracy.

Meanwhile, in the image pickup system constituted as shown in FIG. 3, the size of the image pickup system in the case of not satisfying the expressions (1) and (2) is considered as follows.

For example, where the diameter D3 of the tip portion of the lens 12 is 30 mm, the diagonal length A3 of the image pickup device having a rectangular shape with the ratio of the longer side to the shorter side is 4:3, and the focal length f3 of the lens 12 is 4.5, Expression (1) becomes D/A=D3/A3=30/6=5>4; thus, the condition is not satisfied. In addition, as for Expression (2), f/D=f3/D3=4.5/30; thus, the condition is not satisfied.

In this case, when the larger side of the angle of view (namely, the direction of the longer side of the image pickup device 13) is used in the height direction, the height H3 from the upper end to the lower end of the plane mirror 14 and the extent L3 of the top surface of the pyramid formed mirror are H3=136 mm and L3=369 mm respectively. This brings the determinate result in size which are not practical in the case of picking up an image by installing the image pickup system on a stage or in the case of shooting the interior of a small automobile.

In addition, in the case where, for example, the diameter D3 of the tip portion of the lens 12 is 15 mm, the diagonal length A3 of the image pickup device 13 having a rectangular shape with the ratio of the longer side to the shorter side is 4:3 is 3 mm, and the focal length f3 of the lens 12 is 2.25, Expression (1) becomes D/A=D3/A3=15/3=5>4; thus, the condition is not satisfied. As for Expression (2), f/D=f3/D3=2.25/15=0.15; thus, the condition is not satisfied.

In this case, where the larger side of the angle of view (namely, the direction of the longer side of the image pickup device 13) is used in the height direction, the height H3 from the upper end to the lower end of the plane mirror 14 and the extent L3 of the top surface of the pyramid formed mirror, which dominantly determine the size of the image pickup system, are H3=76 mm and L3=196 mm respectively. Thus, the image pickup system is comparatively large in size, notwithstanding that the small image pickup devices with the diagonal angle A3=3 mm are used.

Further, in the image pickup system constituted as shown in FIG. 3, the size of an image pickup system, which satisfies Expression (1) but does not satisfy Expression (2) will be considered. For example, where the diameter D3 of the tip portion of the lens 12 is 7 mm, the diagonal length A3 of the image pickup device 13 having a rectangular shape with the ratio of the longer side to the shorter side is 2 mm, and the focal length f3 of the lens 12 is 1, Expression (1) becomes D/A=D3/A3=7/2=3.5<4; thus, the condition is satisfied. However, as for Expression (2), f/D=f3/D3=1/7=0.14<0.15; thus, the condition is not satisfied.

In this case, where the larger side of the angle of view (namely, the direction of the longer side of the image pickup device 13) is used in the height direction, the height H3 from the upper end to the lower end of the plane mirror 14 and the extent L3 of top surface of the pyramid formed mirror, which dominantly determine the size of the system, are H3=182 mm and L3=390 mm respectively. Thus, the image pickup system is comparatively large notwithstanding that the small image pickup devices with a diagonal length A3=2 mm are used and the diameter D of the tip portion of the lens 12 is set to be small.

Figure 4:
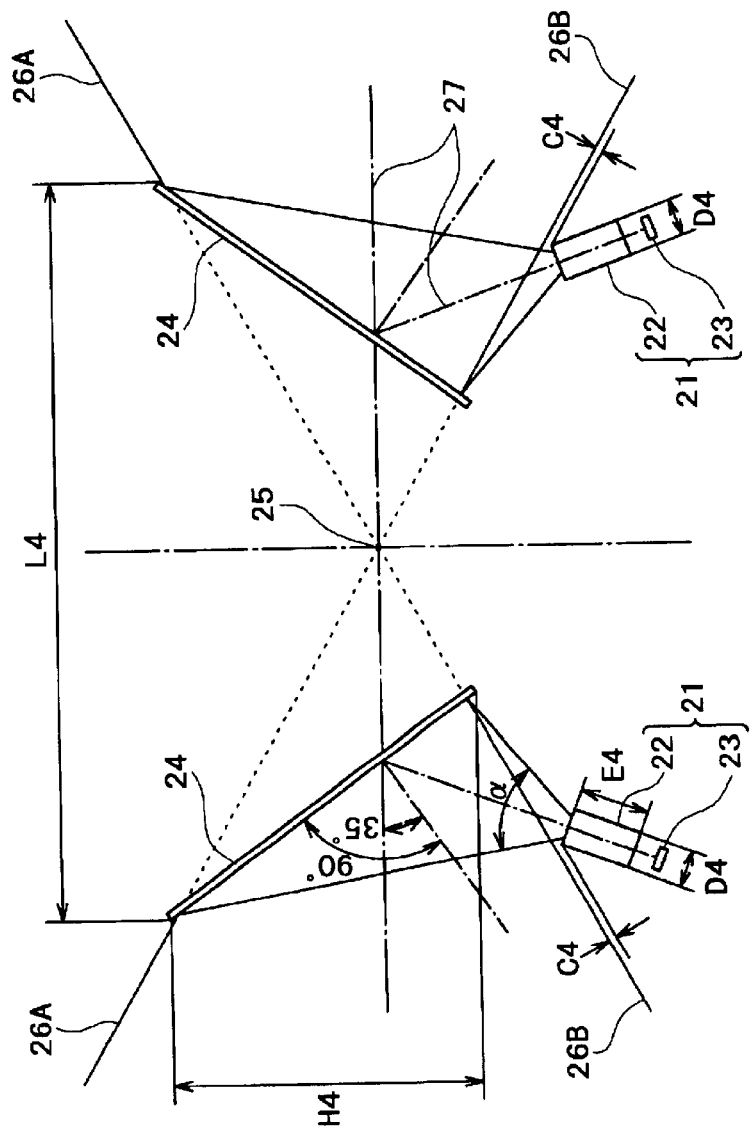
FIG. 4 is a general constitutional diagram of yet another embodiment of the image pickup system according to the present invention.

Next, a general constitutional diagram of yet another embodiment of the image pickup system according to the present invention is shown in FIG. 4. The image pickup device comprises eight plane mirrors 24 arranged in the form of a polygonal pyramid, in this case, an octagonal pyramid, and cameras 21 disposed respectively opposite the plane mirrors 24 in a one-to-one fashion. In FIG. 4, two plane mirrors 24 and two cameras 21 disposed on a vertical plane containing the centerline of the image pickup system are shown.

Each camera 21 comprises a lens 22 and an image pickup device 23, wherein the lens 22 is attached to a camera main body (not shown) in which the image pickup device 23 and the like are contained. The incident rays are reflected by the mirrors 24, incident on the lenses 22, and focused to form images on the image pickup devices 23. The angle of incidence of the ray passing along the lens optical axis 27 on the plane mirror 24 is set at 35 degrees.

In the plurality of cameras 21, the virtual view centers 25 by the plane mirrors 24 are set to substantially coincide with each other, whereby parallax can be restrained. As a result, by splicing the images picked up by the plurality of cameras 21, a wide-range image such as an omnidirectional or full-circumferential image can be obtained.

In this embodiment, also, a small lens of which the diameter D4 of a tip portion is adopted as the lens 22 of the camera 21. With the small lens 22 thus constituted by adopting the lens of which the diameter D4 of the tip portion, the restriction for avoiding the generation of "eclipse" (shading) at the tip corner of the lens 22 can be moderated, and a further reduction in the size of the image pickup system can be contrived.

Furthermore, in this embodiment, the lens 12 of the camera 21 is so constituted as to satisfy the conditional expressions (1) and (2). Namely, this embodiment is based on the combination of such a constitution as to satisfy the conditional expressions (1) and (2) with the constitution wherein the angle of incidence of the ray passing along the lens optical axis on the plane mirror is set to be less than 45 degrees.

Here, it is presumed that, for example, the distance C4 between the angle-of-view end ray 26B passing through the lowermost portion of the angle of view and the tip corner of the lens 22 is 1 mm, the diameter D4 of the tip portion of the lens 22 is 9 mm, the length E4 of the lens 22 is 17 mm, the angle of view α of the lens 22 corresponding to the longer side of the rectangular shape of the image pickup device 23 is 60 degrees, the diagonal length A4 of the image pickup device 23 is 6 mm, and the focal length f4 of the lens 22 is 4.5 mm.

When these values are put into Expressions (1) and (2), $$D/A = D4/A4 = 9/6 = 1.5 < 4$$

$$f/D = f4/D4 = 4.5/9 = 0.5 > 0.15$$

thus, the conditional expressions are satisfied.

In the case of the above size constitution, the height H4 from the upper end to the lower end of the plane mirror 24 and the extent L4 of the top surface of the pyramid formed mirror, which dominantly determine the size of the image pickup system, are H4=74 mm and L4=171 mm respectively. The height from the upper end of the plane mirror 24 to the lower end of the lens 22, inclusive of not only the mirror 24 but also the lens 22, is 111 mm. Incidentally, the overall size of the image pickup system is a size including the size of the camera 21.

According to the above embodiment, the diameter D4 of the tip portion of the lens 22 of the camera 21, the focal length f4 of the lens 22, and the diagonal length A4 of the image pickup device 23 of the camera 21 satisfy the relationships of D4/A4<4 and f4/D4>0.15, whereby it is possible to further reduce the diameter D4 of the tip portion of the lens 22 under the condition where the diagonal length A4 of the image pickup device 23 and the focal length f4 of the lens 22 are fixed, i.e., where the same camera 21 is used, and therefore to reduce the image pickup system in size.

Since the size of the image pickup system can be reduced, the degree of freedom in installation and the portability of the image pickup system can be enhanced. Besides, since optical component parts such as mirrors and the like and mechanism component parts for supporting the optical component parts can be reduced in size, it is possible to reduce the manufacturing cost and parallax through enhancement of component part accuracy.

On the other hand, in the image pickup system constituted as shown in FIG. 4, the size of an image pickup system, which satisfies Expression (2) but does not satisfy Expression (1) will be considered.

For example, where the diameter D4 of the tip portion of the lens 22 is 36 mm, the diagonal length A4 of the image pickup device 23 having a rectangular shape with the ratio of the longer side to the shorter side of 4:3 is 6 mm, and the focal length f4 of the lens 22 is 4.5, Expression (1) becomes D/A=D4/A4=36/6=6□4; thus, the condition is not satisfied. As for Expression (2), f/D=f4/D4=4.5/36=0.125□0.15; thus, the condition is satisfied.

In this case, the height H4 from the upper end to the lower end of the plane mirror 24 and the extent L4 of the top surface of the pyramid formed mirror, which dominantly determine the size of the system, are H4=140 mm or more, and L4=400 mm or more respectively. This brings the determinate result that is not practical in size because the image pickup system will obstruct the audience's view when installed on a stage for picking up an image. In addition, in the case of shooting the interior of a small automobile, the size of the image pickup system will makes the shooting physically impossible.

Figure 5:
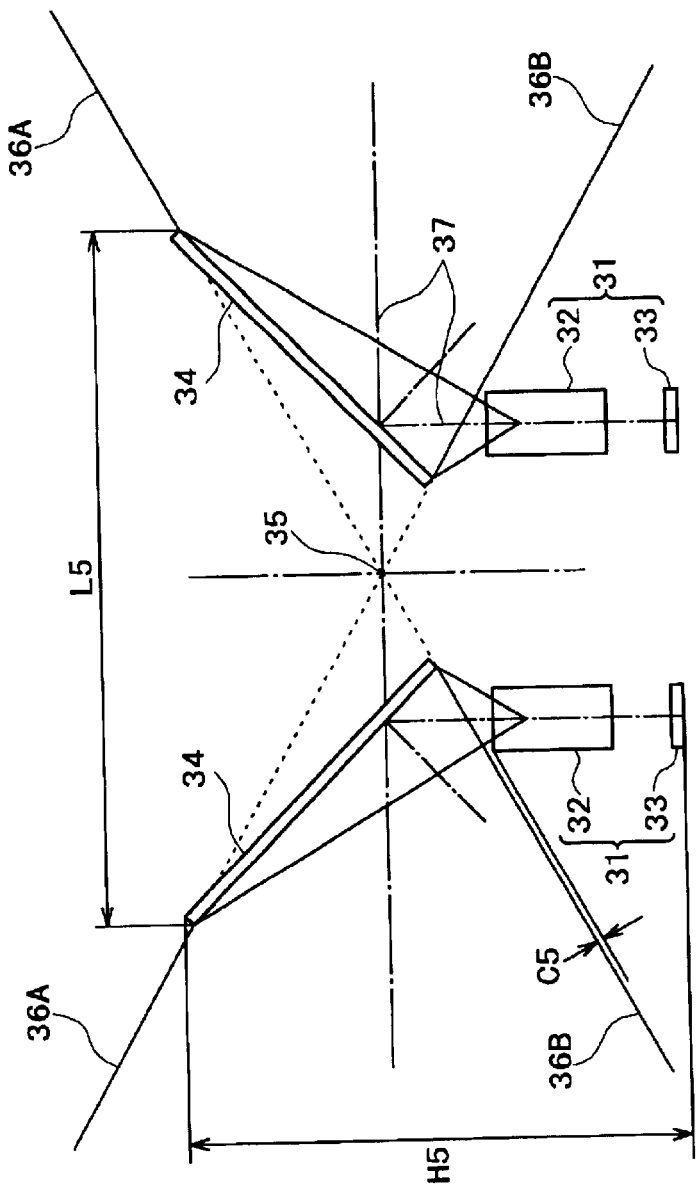
FIG. 5 is a general constitutional diagram of yet further embodiment of the image pickup system according to the present invention.

Next, a general constitutional diagram of yet further embodiment of the image pickup system according to the present invention. The image pickup system comprises eight plane mirrors 34 arranged in the form of a polygonal pyramid, in this case, an octagonal pyramid, and cameras 31 disposed respectively opposite to the plane mirrors 34 in a one-to-one fashion. In FIG. 5, two plane mirrors 34 and two cameras 31 disposed on a vertical plane containing the centerline of the image pickup system are shown.

Each camera 31 comprises a lens 32 and an image pickup device 33, wherein the lens 32 to a camera main body (not shown) in which the image pickup device 33 and the like are contained. The incident rays are reflected by the mirrors 34, incident on the lenses 32, and focused to form images on the image pickup devices 33. The angle of incidence of the ray passing along the lens optical axis 37 on the plane mirror 34 is set at 45 degrees.

In the plurality of cameras 31, the virtual view centers 35 generated by the plane mirrors 34 are set to substantially coincide with each other, whereby parallax can be restrained. As a result, by splicing the images picked up by the plurality of cameras 31, wide-range images such as an omnidirectional or full-circumferential image can be obtained.

In this embodiment, particularly, the distance C5 between an angle-of-view end ray 36B passing through the lowermost portion of the angle of view and the tip corner of the lens 32 is set to be sufficiently small, whereby it is possible to contrive a further reduction in the size of the image pickup system.

Furthermore, in this embodiment, the lens 32 of the camera 31 is so constituted as to satisfy the following conditional expression:

$$0 < C < 2A \quad (3)$$

where C is the distance between the angle-of-view end ray passing through the lowermost portion of the angle of view and the tip corner of the lens of the camera, and A is the diagonal length of the image pickup device of the camera.

The above conditional expression means that the distance between the angle-of-view end ray passing through the lowermost portion of the angle of view and the tip corner of the lens is sufficiently reduced, as compared with the size of the image pickup device, and, as a result, a small-type omnidirectional camera can be constituted.

Here, it is presumed, for example, that the distance C5 between the angle-of-view end ray 36B passing through the lowermost portion of the angle of view and the tip corner of the lens 32 is 0.36 mm, and the diagonal length A5 of the image pickup device 33 is 6 mm.

When these values are put into Expression (3),

C=C5=0.36 and 2A=2·A5=12, therefore,

0<C<2A; thus, the condition is satisfied.

In addition, in the case of the above size constitution, the height H5 from the upper end of the plane mirror 34 to the lower end of the camera 31 (in FIG. 5, the lower end of the image pickup device 33) and the extent L5 of the top surface of the pyramid formed mirror are H5=42 mm and L5=56 mm respectively.

According to the above embodiment, since the relationship of 0<C5<2 A5 is satisfied, where C5 is the distance between the angle-of-view end ray 36B passing through the lowermost portion of the angle of view and the tip corner of the lens 32, and A5 is the diagonal length of the image pickup device 33 of the camera 31, it is possible to further reduce the distance C5 between the angle-of-view end ray 36B passing through the lowermost portion of the angle of view and the tip corner of the lens 32 of the camera 31 under the condition where the diagonal length A5 of the image pickup device 33 is fixed, i.e., where the same camera 31 is used, and therefore to minimize the image pickup system.

Accordingly, since the image pickup system can be reduced in size, the degree of freedom in installation and the portability of the image pickup system are enhanced. Besides, since optical component parts such as mirrors and the like, and mechanism component parts for supporting the optical component parts can be reduced in size, it is possible to reduce the manufacturing cost and parallax through enhancement of component part accuracy.

Incidentally, the image pickup system can be constituted by combining two or three of the above-described constitutions of the present invention, i.e., the constitution of setting the angle of incidence of the ray passing along the lens optical axis on the plane mirror to be less than 45 degrees, the condition of satisfying the conditional expressions (1) D/A<4 and (2) f/D>0.15, and the constitution of satisfying the conditional expression (3) 0<C<2A; such a combination promises a further effective reduction in the size of the image pickup system.

The present invention is not limited to the above-described embodiments, and various other constitutions than the above are possible without departure from the scope of the present invention.

According to the present invention as described above, it is practicable to contrive a reduction in the size of the image pickup system for picking up wide-range images.

Therefore, by minimization of the image pickup system, the degree of freedom in installation and the portability of the image pickup system can be enhanced. In addition, since optical component parts such as mirrors and the like, and mechanism component parts for supporting the optical component parts can be reduced in size, it is possible to reduce the manufacturing cost and parallax through enhancement of component part accuracy.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

What is claimed is:

1. An image pickup system comprising:

a plurality of plane mirrors arranged in the form of a polygonal pyramid; and a plurality of cameras each having a lens and disposed opposite each of said plane mirrors;

wherein the angle of incidence of a ray passing along an optical axis of said lens of each said camera on said plane mirror is set to be less than 45 degrees.

2. An image pickup system as set forth in claim 1, further including a plurality of front lens each provided in front of a corresponding said plane mirror, so that each said plane mirror is disposed at an intermediate position between said plurality of front lenses and said lenses in said cameras.

3. An image pickup system comprising:

a plurality of plane mirrors arranged in the form of a polygonal pyramid; and a plurality of cameras each having a lens and an image pickup device, and disposed opposite each of said plane mirrors;

wherein the relationships of D/A<4 and f/D>0.15 are fulfilled, where D is a diameter of each said lens of said cameras, f is the focal length of each said lens, and A is the diagonal length of said image pickup device of each said camera.

4. An image pickup system comprising:

a plurality of plane mirrors arranged in the form of a polygonal pyramid; and a plurality of cameras each having a lens and an image pickup device, and disposed opposite each of said plane mirrors;

wherein the relationship of 0<C<2A is satisfied, where C is the distance from a tip corner of said lens of said camera to said image pickup angle-of-view end ray nearest thereto, and A is the diagonal length of said image pickup device of said camera.

* * * * *